April 3, 1962 L. R. ERICKSON 3,027,969
AUTOMATIC LOCKING SELF-LEVELING LADDER
Filed Aug. 19, 1959
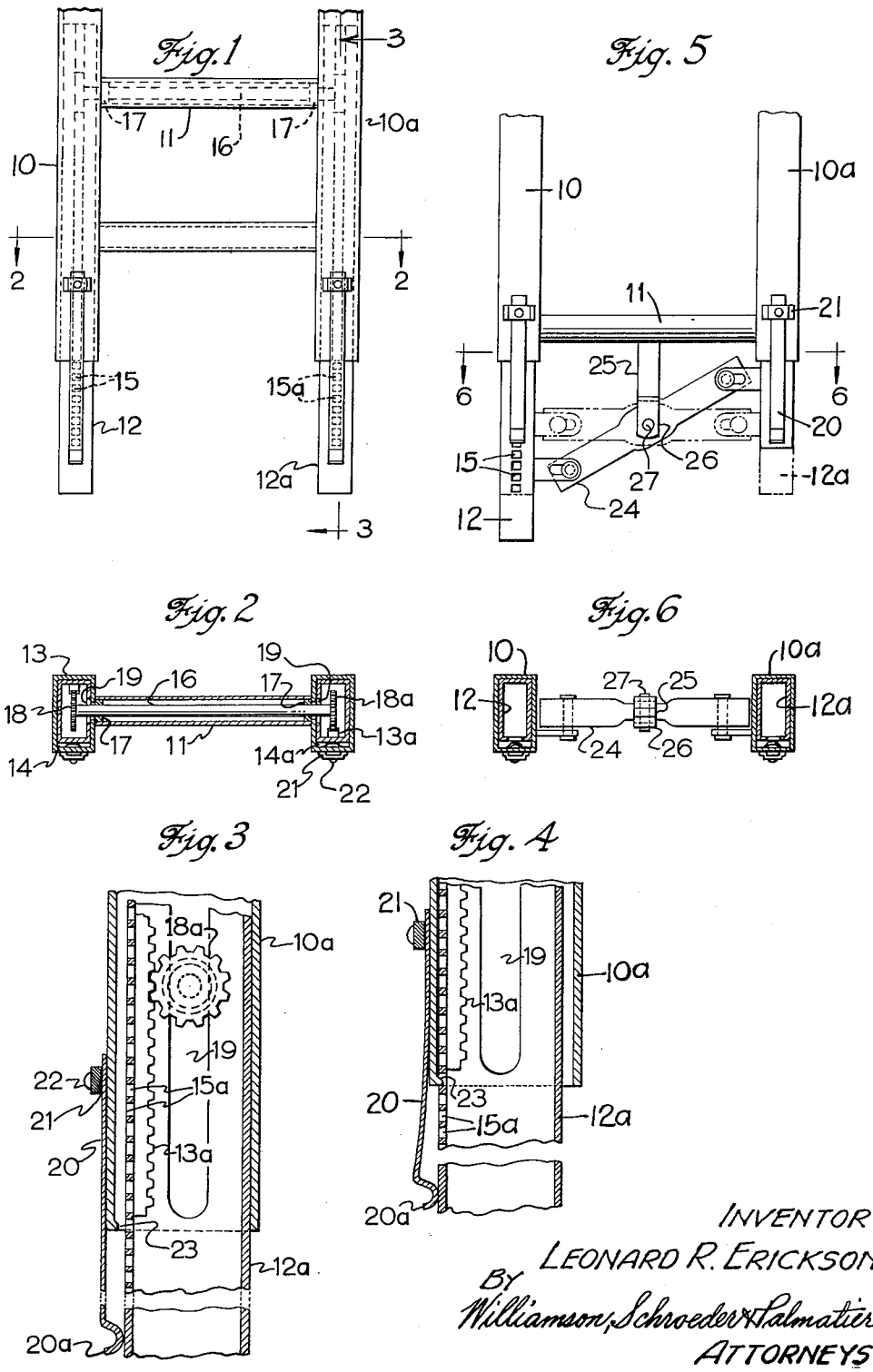
INVENTOR
LEONARD R. ERICKSON
BY
Williamson, Schroeder & Palmatier
ATTORNEYS United States Patent Office 3,027,969
Patented Apr. 3, 1962

3,027,969
AUTOMATIC LOCKING SELF-LEVELING
LADDER
Leonard R. Erickson, Hutchinson, Minn.
Filed Aug. 19, 1959, Ser. No. 834,715
2 Claims. (Cl. 182—202)

This invention relates to a leveling device to be applied to structures having supporting legs such as ladders and the like to maintain said structures in level condition regardless of the irregular contour of the supporting surface upon which the structure rests.

Structures such as ladders, scaffolding and the like are frequently and commonly employed under circumstances wherein their supporting legs rest on and are supported by an uneven surface of irregular contour such as the ground or the like. In such circumstances, a structure of this nature resting on uneven ground causes said structure to tilt which condition may cause the said structure to topple over, to spill any articles supported thereby, or to present an extremely hazardous situation in circumstances where the structure is supporting a person thereon.

Therefore, an important object of my invention is an automatic locking self-leveling structure of the class described which is simple in construction and operation and inexpensive to make, and which is sturdy and capable of long life.

Another object of my invention is a structure of the class described having leveling means associated with the supporting legs thereof for adjusting said legs to an uneven supporting surface to maintain said structure in level condition during use.

Still another object is a structure of the class described having leveling means associated with the legs thereof in which adjacent pairs of supporting legs are simultaneously adjusted to the uneven contour of the supporting surface so that one leg is raised while the other is simultaneously lowered to provide for rapid leveling of the structure.

Still another object is a structure of the class described having a leveling device together with locking means for releasably maintaining the structure in level condition.

Still another object is a structure of the class described having leveling means in combination with locking means for releasably maintaining said structure in adjusted level condition, which locking means are adapted to automatically operate to lock the structure in leveled adjusted condition upon the application of a weight or downward thrust thereon in excess of that normally applied by the weight of the structure itself.

A further object is a structure of the class described in which the locking means are adapted to automatically release from locking engagement when subjected only to the normal weight or downward thrust of the supporting structure itself.

These and other objects and advantages of my invention will more readily appear from the following description made in connection with the accompanying drawings wherein like reference characters refer to the same or similar parts throughout the several views, and in which:

FIG. 1 is a front elevational view of the leveling device of my invention applied to a ladder;

FIG. 2 is a horizontal sectional view taken on the lines 2—2 of FIG. 1;

FIG. 3 is a fragmentary vertical sectional view on an enlarged scale taken along the line 3—3 of FIG. 1, with the members in unlocked condition;

FIG. 4 is a fragmentary vertical sectional view on an enlarged scale illustrating the members in locked position;

FIG. 5 is a front elevational view of another form of my invention as applied to a ladder; and FIG. 6 is a horizontal section taken on the lines 6—6 of FIG. 5.

Referring to the drawings for a more detailed discussion of the preferred embodiments of my invention and particularly to the form of my invention illustrated in FIGS. 1 through 3 inclusive, the numerals 10 and 10a indicate a pair of vertically disposed spaced apart tubular supporting leg members of a structure such as a ladder. The tubular leg members 10 and 10a are rigidly interconnected by means of a horizontally disposed elongate tubular cross brace which in a ladder would preferably function as the next to the bottom rung thereof and is indicated at 11.

The leveling apparatus of my invention includes a pair of extensible and retractable tubular leg members 12 and 12a which are telescopically inserted in the lower ends of the leg members 10 and 10a respectively for sliding reciprocating longitudinal movement with respect thereto. Each of the extensible leg members 12 and 12a are provided internally thereof with elongate rack or gear members 13 and 13a respectively, said rack members being disposed on opposite sides of the structure from one another, the rack 13 in the form shown being disposed on the rear or backward side of the leg member 12 and the rack member 13a being disposed on the front or forward side of the leg member 12a.

The cross-sectional width of the extensible leg members 12 and 12a between the sides thereof corresponds to and is slightly less than cross-sectional width of the leg members 10 and 10a respectively so that their respective sides are in sliding engagement with one another. However, the cross-sectional depth of the leg members 10 and 10a between the front and back ends thereof is somewhat greater than the cross-sectional depth of the extensible members 12 and 12a respectively to provide gaps or spaces 14 and 14a respectively therebetween as best seen in FIG. 2 to permit depthwise cross-sectional play therebetween for a purpose hereinafter to be described.

The front ends of the extensible members 12 and 12a are provided with a series of vertically disposed horizontally spaced splots 15 and 15a respectively for a purpose hereinafter to be described.

A shaft 16 is rotatably enclosed within the rung 11 and is supported for rotation therewithin by suitable bearings 17 disposed at opposite ends thereof. The outer ends of the shaft 16 extend into the interior of the leg members 12 and 12a, which shaft is provided at the ends thereof disposed within the interiors of said leg members with suitable sprockets 18 and 18a respectively. The sprockets 18 and 18a are adapted to engage the racks 13 and 13a respectively to drive or move the extensible leg members 12 and 12a simultaneously in opposite directions upon rotation thereof, the reverse movement of the legs being provided for by the opposite or reverse engagement of the rack members 13 and 13a with the sprockets 18 and 18a respectively. At this point it should be noted that the inner sides of the leg members 12 and 12a are provided with elongate vertical slots 19 in which slots the shaft 16 rides to permit free movement of the extensible leg members 12 and 12a with respect thereto.

Thus, it can be seen and readily understood that when the lower ends of the extensible leg portions 12 and 12a are placed on uneven ground the leg member first engaging the ground will move upwardly, which movement causes rotation of the sprocket engaged therewith which in turn causes rotation of the shaft 16 and simultaneous rotation of the sprocket attached to the other end thereof, the rotation of said other sprocket causing simultaneous downward movement of the other extensible leg portion until such time as the lower ends of both of the extensible leg members rest on a firm support and the ladder or supported structure is in leveled condition. The reverse engagement of the sprockets 18 and 18a with their respective rack members 13 and 13a not only serves to drive the leg members 12 and 12a in opposite directions simultaneously during leveling thereof, but also provides a braking or locking relationship between the legs 10 and 10a and 12 and 12a respectively when both of the legs 12 and 12a are firmly supported and normally prevents relative longitudinal or vertical movement between the telescoped leg members under such circumstances. However, during use, structures such as ladders and scaffolds normally carry or support heavy bodies and objects, the weight of which in many instances might cause disengagement of the sprockets and the racks with resulting tilting or falling of the supported structure. Therefore, to prevent such undesirable occurrences, I provide a more positive means for locking the leg members 10 and 12 and 10a and 12a together during use.

To permit automatic locking and unlocking of the extensible portions 12 and 12a with respect to the supporting legs 10 and 10a, I have provided a novel and unique locking mechanism. This mechanism includes for each of the legs an elongate vertically disposed flat spring member 20 carried by each of the leg members 10 and 10a and attached to the upper end thereof by means of a clamp 21 and a suitable fastening element such as the screw 22. The spring members 20 extend below the lower marginal edges of the leg members 10 and 10a, the lower end of said springs being provided with enlarged inwardly extending arcuate portions 20a which are adapted to engage and ride against the outer surfaces of the extensible leg portions 12 and 12a. The inner surfaces of the leg members 10 and 10a are provided with inwardly extending male locking members or dogs 23 which are adapted to engage one of the slots or apertures 15 which have been milled in the face of the extensible leg portions 12 and 12a. The spring members 20 are so tensioned that in normal condition, with the supporting structure carrying no additional weight or not being provided with additional downward thrust other than that provided by the weight thereof, the spring members will hold the leg members 10 and 10a away from the extensible portions 12 and 12a and simultaneously disengage the lock member 23 from engagement with the milled slots 15. However, the tension of the spring member 20 is such that a slight downward pressure on the leg members 10 and 10a such as might be provided by a person stepping on the rung of the ladder automatically causes the leg members 10 and 10a to move inwardly towards the extensible portions 12 and 12a and engage the dogs 23 with one of the apertures or slots 15 to positively lock the two members together and prevent relative longitudinal or vertical movement therebetween. Conversely, as soon as the downward pressure or weight is released, the tension of the spring automatically forces the leg members 10 and 12 and 10a and 12a apart and disengages the dogs or lock members 23 from locking engagement with the slots 15.

Another form of my invention is illustrated in FIGS. 4 and 5. In this version of my invention as seen in FIGS. 4 and 5 parts and elements corresponding to those shown in FIGS. 1 through 3 inclusive are indicated by the same numerical references. In the form of the invention illustrated in FIGS. 4 and 5 the shaft 16, the sprockets 18 and the gear racks 13 are dispensed with and different leveling mechanism is substituted therefor. This substituted leveling mechanism or apparatus includes an elongate lever member 24 which is swivelly secured at the opposite ends thereof to the extensible leg portions 12 and 12a to interconnect the same. The lever member 24 is pivotally suspended from the rung 11 by means of a supporting bracket 25 depending from and secured to the bottom of the rung 11 and carrying a clevis 26 which encloses the cross member 24 and pivotally supports the same by means of a pivot element such as a pin 27. Thus, as one of the legs 12 or 12a moves upwardly the other leg is moved downwardly through the interconnection of said legs by the lever member 24 and the pivotal connections provided by the pin 27. In the form shown in FIGS. 4 and 5 the locking mechanism previously described for FIGS. 1 through 3 inclusive is the same.

From the foregoing, the advantages of my invention are readily apparent. A structure such as a ladder or scaffold which is equipped with my leveling apparatus is capable of automatically adjusting itself to any uneven supporting surface without any effort or adjustment required on the part of the user to maintain the structure in a safe level condition. In addition, the locking mechanism is completely automatic both as to locking and unlocking thereof so that the structure may be freely moved from place to place and automatically accommodate itself to the particular supporting surface in each instance.

In short, a structure such as a ladder employing my invention is simplicity itself to operate, inexpensive to make and capable of sturdy construction to withstand for a long period of time the wear and tear thereon.

It will, of course, be understood that various changes may be made in the form, details, arrangement and proportions of the various parts without departing from the scope of my invention.

What I claim is:

1. A self-leveling device comprising a ladder structure having a first pair of elongate supporting leg members, a second pair of elongate extensible and retractable leg members cooperatively engaged with said supporting leg members for relative reciprocating longitudinal movement therebetween, a rotatable shaft extended between and rotatably mounted upon said supporting leg members against movement longitudinally thereof, a pair of pinion members carried by said shaft at opposite ends thereof and rotable therewith, rack members carried by said second leg members and engaged with said pinion members, said rack members being disposed on opposite sides of said shaft and pinions in such fashion that longitudinal movement of one of said second leg members in one direction effect simultaneous longitudinal movement of the other of said second leg members in the opposite direction, a locking element carried by one of said supporting leg members, a locking element carried by one of said second leg members, said elements moving into and out of locking engagement with one another in response to relative transverse movement of said first and second leg members with respect to one another, and a spring member extending transversely of and between said first and second leg members normally maintaining them in spaced apart unlocked relationship and yieldingly responsive to pressure having a transverse component applied to said supporting leg members to permit relative transverse movement therebetween to move said locking elements into cooperative locking engagement with one another.

2. A self-leveling supporting device comprising ladder structure having a first pair of elongated supporting leg members, a second pair of elongate extensible and retractable leg members cooperatively engaged with said supporting leg members in loose fitting relation for relative reciprocating longitudinal movement therebetween and for limited relative transverse movement therebetween, said cooperatively engaged leg members having opposed interior and exterior surfaces, a rotable shaft extending between and rotatably mounted upon said supporting leg members against movement longitudinally thereof, a pair of pinion members carried by said shaft at opposite ends thereof and rotatable therewith, rack members carried by said second leg members and engaged with said pinion members, said rack members being disposed on opposite sides of said shaft and pinion in such arrangement that longitudinal movement of one of said second leg members in one direction effects simultaneous longitudinal movement of the other of said second leg members in the opposite direction, a locking member carried by the interior surface of one of said cooperatively engaged leg members, a cooperative locking member carried by the exterior surface of the other cooperatively engaged leg member, said locking members being each disposed remotely relative to said pinion members and moving into and out of cooperative locking engagement with one another in response to relative transverse movement of said first and second leg members with respect to one another, and spring means carried by one of said leg members and cooperatively engaging the other to normally maintain said locking members in spaced apart unlocked relationship and yieldingly responding to pressure having a transverse component when applied thereto to permit relative transverse movement between said first and second legs to move said locking members into cooperative locking engagement with one another.

References Cited in the file of this patent

UNITED STATES PATENTS

| | | |
|---|---|---|
| 368,199 | Edgar | Aug. 16, 1887 |
| 2,109,787 | Warren | Mar. 1, 1938 |
| 2,113,282 | Quinn | Apr. 5, 1938 |
| 2,139,479 | Wertz | Dec. 6, 1938 |
| 2,444,384 | Thie | June 29, 1948 |
| 2,451,113 | Ozols | Oct. 12, 1948 |
| 2,476,650 | Biery | July 19, 1959 |
| 2,894,670 | Anderson | July 14, 1959 |

FOREIGN PATENTS

| | | |
|---|---|---|
| 63,045 | Norway | Dec. 2, 1940 |
| 342,693 | Italy | Aug. 10, 1936 |
| 636,896 | Great Britain | May 6, 1947 |